United States Patent

[11] 3,630,049

| [72] | Inventors | Otto Feller;<br>Paul Vossieck, both of Burscheid, Germany |
|---|---|---|
| [21] | Appl. No. | 19,852 |
| [22] | Filed | Mar. 16, 1970 |
| [45] | Patented | Dec. 28, 1971 |
| [73] | Assignee | Goetzewerke Friedrich Goetze<br>Aktiengesellschaft<br>Burscheid, Germany |

[54] ELASTIC SHAFT COUPLING
13 Claims, 7 Drawing Figs.

[52] U.S. Cl. ..................................................... 64/13,
64/27 NM
[51] Int. Cl. ..................................................... F16d 3/78
[50] Field of Search ........................................ 64/11 R,
13, 27 NM

[56] References Cited
UNITED STATES PATENTS

| 2,998,717 | 9/1961 | Schwenk | 64/11 X |
| 2,982,118 | 5/1961 | Franceschetti et al | 64/11 X |
| 2,449,654 | 9/1948 | Jessop | 64/13 |

FOREIGN PATENTS

| 836,409 | 6/1960 | Great Britain | 64/13 |
| 972,708 | 8/1950 | France | 64/11 |

*Primary Examiner*—Kenneth W. Sprague
*Attorney*—Spencer & Kaye

ABSTRACT: An elastic shaft coupling for joining two approximately aligned shafts to compensate for possible shaft-misalignments and to damp torsional vibrations. An annular body of rubber is supported on its inner diameter by a relatively rigid support body. About the outer diameter of the annular rubber body are arranged securement elements for effecting attachment of the coupling to and between the approximately aligned shafts. A band encircles the body of rubber and presses the securement elements radially inwardly so that columns of rubber existing between the securement elements and the support body are placed under compression.

PATENTED DEC 28 1971 3,630,049
SHEET 1 OF 2
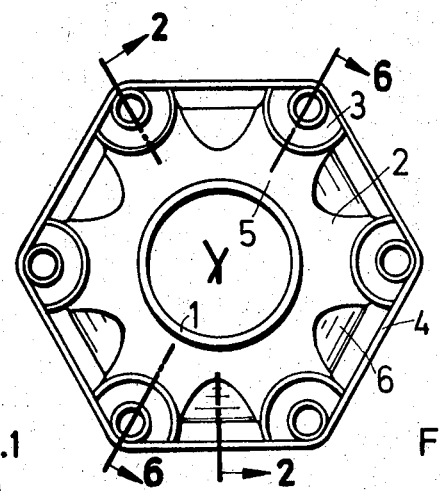
FIG. 1
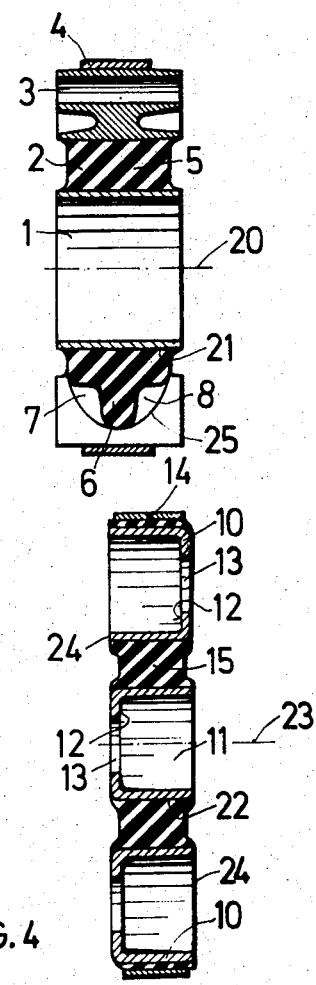
FIG. 2
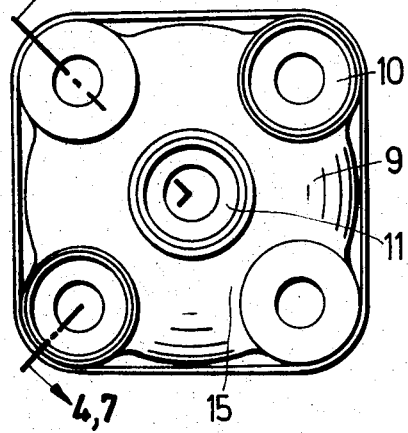
FIG. 3
FIG. 4
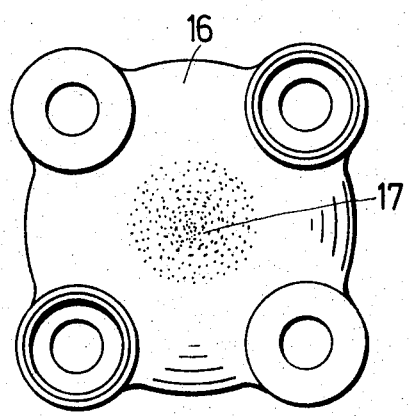
FIG. 5
Inventors
Otto Feller &
Paul Vossieck
By Spencer & Kaye
Attorneys Inventors
Otto Feller &
Paul Vossieck By Spencer & Kaye
Attorneys.

ELASTIC SHAFT COUPLING

BACKGROUND OF THE INVENTION

The present invention relates to an elastic shaft coupling which includes a pad or ring of rubber or similar material having shaft securing elements on its outer peripheral zone.

There are many elastic couplings intended for interposition in the steering shafts of motor vehicles. These are formed essentially of a rubber pad or ring. The steering shafts are in two pieces which are aligned and the ends of which face one another. The facing ends are provided with flanges and the elastic coupling is situated between the facing flanges. The elastic couplings have relatively rigid elements vulcanized in place and these rigid elements are provided with bores. Bolts running from the flanges penetrate into these bores and are secured in place. It is usual to provide an even number of such rigid elements and to connect them alternately to one of the two mutually facing flanges. Thus, half of the number of rigid elements are connected to one shaft and half to the other. Prior elastic couplings are illustrated, for example, in the following U.S. Pat. Nos. 3,308,637 of Hans Deuring for a "Coupling Element;" and 3,353,373 of Rolf Schumacher et al. for a "Flexible Coupling."

Elastic shaft couplings find use not only in the steering shafts of motor vehicles. Other shafts in which they are used are, for example, crankshafts and axle shafts. While steering shaft elastic couplings are ordinarily only subjected to relatively small torsion loads at relatively small angular displacement of one shaft relative to the other, the elastic coupling for crankshafts and axle shafts can experience considerably larger torques and substantially greater angular displacement between abutting shafts. Both the elastic couplings used in steering shafts and those used for crankshafts have as one of their functions, the job of absorbing any jerkiness in the rotation of one shaft relative to the other. Usually, here again, the loading conditions in crankshafts and axle shafts are considerably more demanding than in steering shaft couplings. The life of an elastic shaft coupling depends primarily on the ability of the rubber between the rigid securement elements to stand up over extended periods of time to alternating loading of given maximum amplitude.

Energy absorption in the elastic shaft couplings of the prior art, for example that illustrated by U.S. Pat. No. 3,296,827 of Fred K. Landon Jr. et al., for a "Resilient Coupling," results primarily from pressure loading of the separate rubber columns extending between the rigid securing elements. Energy absorption in such couplings is unsatisfactorily low.

In the field of torsional vibration dampers for disc clutches, a new damper design has been developed. This new design is characterized by the transmission of the torque by the shear loading of rubber bodies which have been placed under a radial compressive force. Such torsional vibration dampers are illustrated in French Pat. No. 1,439,117.

SUMMARY OF THE INVENTION

It is an object of the present invention to avoid the above-described disadvantages of prior elastic shaft couplings. Another object of the invention is to provide a shaft coupling which can be easily manufactured. Yet another object of the invention is to provide a shaft coupling having a minimal mass which can also be used as a torsional vibration damper.

These as well as other objects which will become apparent in the discussion that follows are achieved, according to the present invention, by utilizing knowledge gained in study of torsional vibration dampers of the type represented by the above-mentioned French patent. Thus it has been learned that combined shear-compression loading of rubber sections makes it possible to achieve greater loads for a given service life and a constant rubber volume. Naturally, greater torques can also be accommodated by a given volume of rubber and for a given service life.

The above objects are accomplished in the present invention by providing a support element centrally within a rubber body, such as a pad or ring, while on the outside of the pad or ring are mounted securement elements. Rubber columns extending radially between the securement elements and the central support element are continually under a radial compression during service.

The radial precompressing of the columns lying between the support element and the securement elements causes a deflection of the force flow through the rubber; the flow is no longer, as in the prior art, directed substantially in a straight line from securement element to securement element. In the present invention, the force flow is down into the radial columns and over the support element. The precompressed rubber columns between the securement elements and the support elements are loaded in shear during transmission of torque between shafts, so that the desired favorable shear-compression loading is achieved. Consequently, it is possible for a given maximum design torque, to hold the rubber body to relatively small dimensions and this savings in total mass of rubber required results in a lowering of the total cost of manufacture. Moreover, this lower total mass of the rubber results in a lowering of inertial effects. Lower inertial effects are of special importance where the elastic coupling must also serve as a torsional vibration damper as in the case of couplings used for motor vehicles.

BRIEF DESCRIPTION OF THE DRAWINGS

FIG. 1 is a plan view of an elastic shaft coupling according to the invention.

FIG. 2 is a section taken along the line 2—2 of FIG. 1.

FIG. 3 is a plan view of a second embodiment of the elastic shaft coupling of the invention.

FIG. 4 is a sectional view along the line 4—4 of FIG. 3.

FIG. 5 is a third embodiment of part of the elastic coupling of the present invention in plan view.

DESCRIPTION OF THE PREFERRED EMBODIMENTS

Figure 6:
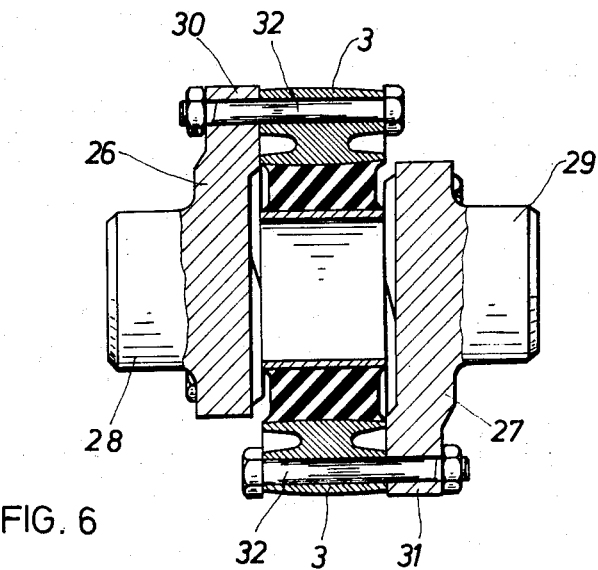
FIG. 6 is a section taken along the line 6—6 of the elastic coupling of FIG. 1 mounted between two coupling plates.

According to one embodiment of the present invention, the central support element in the rubber body is a metal tube which can be quite simply produced by cutting an appropriate length from a pipe. Preferably the support element should be actually connected to the rubber body through a vulcanization process in order to prevent any slipping between the rubber body and the support element. In this case there is no need to rely on friction between the rubber body and the support element to prevent slippage.

In order to influence the spring behavior of the coupling of the invention, the rubber cross sections lying between adjoining securement elements can be decreased by, for example, trough-shaped recesses. Also, it is advantageous if the rubber sections between adjoining securement elements are given a convex curvature, because it has been found that at large angular deflection of one shaft relative to the other, a flow of rubber into the precompressed regions otherwise gives rise to notching along the outer periphery which notching can have a deleterious effect on the life of the coupling.

The action of the support element of the present invention depends on the diameter ratio of the rubber body to the support element. "Diameter" is used here with a certain amount of license, since it is meant to include not only circular outer peripheries, but also, for example, polygonal ones. In the case of polygonal outer peripheries there is at least an average diameter. Preferably the ratio of diameters should be around 3:1; that is, the outer diameter of the support element should be at least one third the outer diameter of the rubber body. In any given design according to the present invention, the diameter ratio can be chosen smaller as the outer diameter of the rubber body increases. Thus in larger couplings it is possible, for example, to have a diameter ratio of 2:1.

For purposes of illustration, a rubber ring 2 of FIGS. 1 and 2 having an outer diameter of 9 centimeters, as measured on the circle containing the axes of bores of the securement elements 3, was provided with a tube 1 having an outer diameter of 3 centimeters, while a rubber ring having an outer diameter of 15 centimeters was equipped with a tube having an outer diameter of 7.5 centimeters.

Referring in particular to FIGS. 1 and 2, one coupling according to the present invention includes a tubular inner support element 1 encompassing axis 20, a rubber ring 2, and six securement elements spaced around the outer periphery of the rubber ring 2. The securement elements 3 and the support element 1 are in the mold during vulcanizing of the rubber, so that bonds arise at the interface between the inner periphery 21 of the rubber ring 2 and the outer surface of the support element 1 and at the interfaces between the securement elements and the rubber ring. A tension band 4 surrounds support element 1, the rubber ring 2, and the securement elements 3 and places the rubber columns 5 lying between the support element and the securement elements in radial compression. It will be evident at this point that the function of support element 1 is to support via its relative rigidity, the inner periphery 21 against radially inwardly directed compressive forces transmitted through columns 5 from tension band 4.

The rubber sections perpendicular to lines between adjoining securement elements such as the section of strut 6 appearing in FIG. 2 have been provided with trough-shaped recesses 7 and 8 so that a reduced cross section exists between adjoining securement elements. This reduces the effective spring constant of the parts of the rubber body lying between adjoining securement elements. The above-mentioned convex curvature is shown by outline 25. The securement elements 3 are castings and their special shape results in a reduced total weight for the coupling.

According to another embodiment of the present invention, the securement elements are deep-drawn sheet metal shells. In the floor of each shell there is provided a central hole through which a bolt may extend in order to provide attachment to a shaft flange. An especially inexpensive and simple manufacture is achieved if these deep-drawn sheet metal shells are also used as the central support element of the present invention. The support body can at the same time serve for purposes of centering.

Thus referring to FIGS. 3 and 4, rubber pad 9 has an inner periphery 22 encompassing an axis 23 and carries, as four securement elements, shells 10, which are also vulcanized in place. There is furthermore provided a support body 11 which is actually just another of the securement shells 10. The cup rims 24 of the securement shells 10 alternately face up from the plane of FIG. 3 and down from the plane of FIG. 3, those shells facing up being intended for connection to one shaft, those facing down being intended for connection to the other of the shafts. It will be noted that both in FIG. 3 and in FIG. 1 there is an even number of securement elements. Half of the securement elements are to be connected to one of the shafts, half to the other.

Each of the deep-drawn sheet metal shells 10 and 11 has a floor 12 in which a hole 13 has been drilled to receive bolts extending from flanges on axially aligned shafts which are to be connected by way of the elastic shaft coupling of the invention. During vulcanizing, the shells 10 and 11 are held in proper position in the mold by pins which are fixed in the mold and which extend into the holes 13.

As in FIGS. 1 and 2, the shaft coupling of FIGS. 3 and 4 is also surrounded by a tensioning band, in this case tensioning band 14. The tensioning band 14 presses against the securement shells 10 and with the help of the support element 11 places the rubber columns 15 lying between the securement shells 10 and the support shell 11 into a state of radial compression. The elastic shaft coupling of FIGS. 3 and 4 is installed and used between two substantially aligned shafts while in this precompressed condition.

FIG. 5 shows a third shaft coupling of the present invention. This coupling has not yet been placed in a precompressed state. The rubber pad 16 shown in this figure is essentially the same as that shown in FIGS. 3 and 4 except that the support element 11 of FIGS. 3 and 4 is replaced in FIG. 5 by a hard rubber core 17. This pad is manufactured by placing an already vulcanized core 17 centrally in the mold for vulcanizing the pad 16. Upon vulcanizing the pad 16, a bond arises at the interface between pad 16 and core 17. An example of rubber hardnesses is a Shore A durometer hardness of 55 for the pad and a Shore A durometer hardness of 90 for the core.

Referring now to FIG. 6, there is shown a cross section taken through the elastic coupling as shown in FIG. 1, constructed according to the present invention and disposed between two coupling plates 26 and 27. As shown, each of the coupling plates 26 and 27 is provided with a hub 28 and 29, respectively, for mounting on the end of a shaft and each plate further includes three flanges 30 and 31 alternately connected to the securement elements 3 of the elastic coupling by any suitable mounting means such as nuts and bolts 32.

Figure 7:
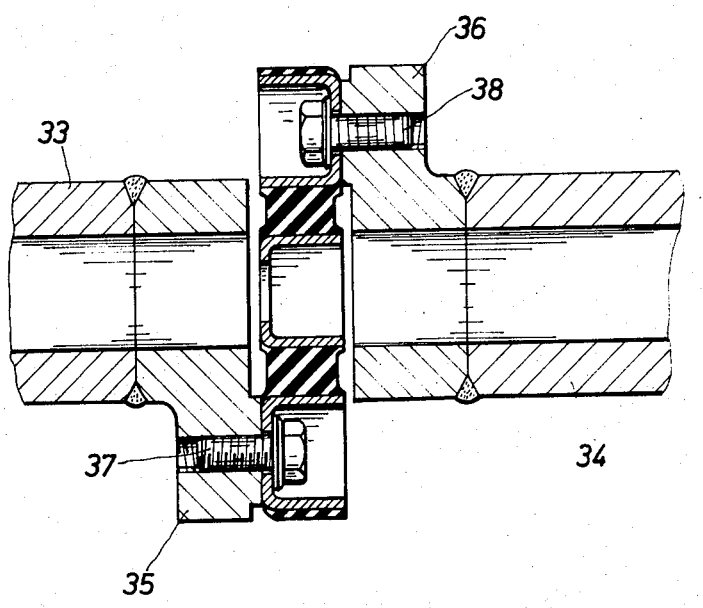
FIG. 7 is a section taken along the line 7—7 of FIG. 3 as shown in FIG. 4 whereby the elastic shaft coupling is mounted between the ends of two shafts.

In FIG. 7 there is shown a cross section taken through the elastic coupling as shown in FIG. 3 whereby the coupling is mounted between the ends of the two shafts 33 and 34. Each end of the shafts 33 and 34 is provided with diametrically opposed hubs 35 and 36, which are alternately connected with the securement shells 10 by, for example, bolts 37 and 38.

In both cases, as illustrated in FIGS. 6 and 7, the tension band 4 and 14 is removed after mounting the coupling between the plates 26 and 27 and the shafts 33 and 34, respectively.

An example of rubber for the present invention is natural rubber; also usable are synthetic rubbers, such as neoprene or Buna N.

Metal tube 1 and shells 10 and 11 may, for example, be of aluminum containing 1.2 weight percent magnesium, in the annealed condition. Their outer surfaces are roughened with a wire brush to improve bonding with the rubber.

While there is some improvement over prior elastic couplings with even slight precompression of columns 5 and 15, in a preferred example the lengths of columns 5 and 15 between the securement elements and the support element are decreased by 10 to 20 percent.

While precompression is achieved in the above description through the use of tensioning bands 4 and 14, this may be done as disclosed in U.S. Pat. No. 3,296,827, i.e., the precompression of the columns 5 and 15 of the present invention can be achieved by placing the holes in the shaft flanges radially inwards from the bores of the securement elements 3. Consequently, when bolts run from the shaft flanges through the bores of the securement elements 3, the columns 5 and 15 are under precompression.

It will be understood that the above description of the present invention is susceptible to various modifications, changes and adaptations and the same are intended to be comprehended within the meaning and range of equivalents of the appended claims.

I claim:

1. A coupling for joining two approximately aligned shafts, said coupling comprising a rubber body having an inner periphery encompassing an axis of the rubber body, means carried by said body and spaced radially outwardly from said inner periphery for securing said body to said shafts, means for supporting said inner periphery against radially inwardly directed compressive forces on said body, said body including columns lying between, and in contact with the securing means and the supporting means, and means forcing said securing means toward said supporting means for placing said columns between said securing means and said supporting means under radial compression.

2. A coupling as claimed in claim 1, said supporting means comprising a relatively rigid tube, the axis of which is substantially parallel to said axis of the rubber body.

3. A coupling as claimed in claim 1, further comprising a vulcanized bond between said rubber body and said supporting means.

4. A coupling as claimed in claim 1, said securing means comprising a plurality of sheet metal shells having cup shapes, the axes of said shells being substantially parallel to said axis of the rubber body, the floors of said shells exhibiting central holes.

5. A coupling as claimed in claim 4, said supporting means comprising a sheet metal shell having a cup shape, the axis of the shell of the supporting means being substantially parallel to said axis of the rubber body, the floor of the shell of the supporting means exhibiting a central hole.

6. A coupling as claimed in claim 1, said supporting means comprising a relatively rigid core and a vulcanized bond between said rubber body and said core.

7. A coupling as claimed in claim 6, said core being made of rubber.

8. A coupling as claimed in claim 1, said rubber body having strut sections extending between adjoining securing means, said strut sections having cross-sectional dimensions in the direction of said axis of the rubber body less than the corresponding dimensions of said columns.

9. A coupling as claimed in claim 1, the sections of said rubber body between adjoining securing means having a convex curvature.

10. A coupling as claimed in claim 1, the diameter of said inner periphery being at least one-third of the outer diameter of said rubber body.

11. An elastic shaft coupling comprising, in combination:
a. a rotationally symmetrical, generally flat body made of elastometric material;
b. a support arranged generally in the center of the body and being concentric therewith;
c. a plurality of securing means arranged on said body, generally in the region of the outer periphery thereof and being spaced from said support, for securing the coupling to two generally aligned shafts, in consequence of which there are a plurality of body regions which are located between said support and respective ones of said securing means;
d. said regions of said body, when the coupling is secured to the shafts, being radially prestressed for compression.

12. A coupling as claimed in claim 1, said radial compression being of a magnitude characterized by a decrease in the lengths of said columns between said securing means and said support means of 10 to 20 percent.

13. A coupling for joining two approximately aligned shafts, said coupling comprising a rubber body having an inner periphery encompassing an axis of the rubber body, means carried by said body and spaced radially outwardly from said inner periphery for securing said body to said shafts, relatively rigid means for supporting via its relative rigidity said inner periphery against radially inwardly directed compressive forces on said body, said body including columns lying between and in contact with the securing means and the supporting means, and means forcing said securing means toward said supporting means for placing said columns between said securing means and said supporting means under radial compression.

* * * * *